(12) United States Patent
Eichstaedt et al.

(10) Patent No.: US 6,662,230 B1
(45) Date of Patent: Dec. 9, 2003

(54) SYSTEM AND METHOD FOR DYNAMICALLY LIMITING ROBOT ACCESS TO SERVER DATA

(75) Inventors: Matthias Eichstaedt, San Jose, CA (US); Michael Lawrence Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/421,978

(22) Filed: Oct. 20, 1999

(51) Int. Cl.[7] .................................................. H04L 9/00
(52) U.S. Cl. .................... 709/229; 709/224; 709/223; 709/225; 709/226; 709/217; 709/219
(58) Field of Search .................... 709/224–9, 217; 713/201

(56) References Cited

U.S. PATENT DOCUMENTS

| | | | |
|---|---|---|---|
| 4,937,743 A | 6/1990 | Rassman et al. ............ 364/401 |
| 5,553,239 A | 9/1996 | Heath et al. ........... 395/187.01 |
| 5,627,886 A | 5/1997 | Bowman .................... 379/111 |
| 5,678,041 A | 10/1997 | Baker et al. ................. 395/609 |
| 5,708,780 A | 1/1998 | Levergood et al. .... 395/200.12 |
| 5,748,954 A | 5/1998 | Mauldin ..................... 395/610 |
| 5,787,253 A | 7/1998 | McCrery et al. ....... 395/200.61 |
| 5,796,952 A | 8/1998 | Davis et al. ........... 395/200.54 |
| 5,809,230 A | 9/1998 | Pereira ....................... 395/186 |
| 5,813,006 A | 9/1998 | Polnerow et al. ............. 707/10 |
| 5,835,724 A | 11/1998 | Smith .................... 395/200.57 |
| 5,862,260 A | 1/1999 | Rhoads ....................... 382/232 |
| 5,870,559 A | * 2/1999 | Lesham et al. ........ 395/200.54 |
| 5,892,917 A | * 4/1999 | Myerson ................ 395/200.51 |
| 5,894,554 A | 4/1999 | Lowery et al. ........ 295/200.33 |
| 5,996,011 A | * 11/1999 | Humes ....................... 709/225 |
| 6,026,440 A | * 2/2000 | Shrader et al. ............. 709/224 |
| 6,038,563 A | * 3/2000 | Bapat et al. .................. 707/10 |
| 6,199,102 B1 | * 3/2001 | Cobb ......................... 709/206 |
| 6,256,739 B1 | * 7/2001 | Skopp et al. ............... 713/201 |

* cited by examiner

Primary Examiner—David Wiley
Assistant Examiner—Alina Boutah
(74) Attorney, Agent, or Firm—Lumen Intellectual Property Services, Inc.

(57) ABSTRACT

A method for automatically limiting access of a client computer to data objects accessed through a server computer dynamically prevents robots or webcrawlers from obtaining too much of the server database and from dramatically reducing server performance. The method includes the steps of receiving a request for a data object, recording a log entry for the request, calculating client request values, and refusing the request if a client request value exceeds one of a set of corresponding predefined maximum request values. Each log entry contains a client identifier, timestamp, and at least one data object identifier for the request. The client request values preferably include a request frequency, which is compared with a predefined maximum request frequency, and a cumulative data request, which is compared with a data access threshold. If the client is refused access, the client identifier is added to a deny list, and future requests from the client are automatically denied. The calculated cumulative data request may be for a single client, or it may be for all clients, in order to detect a robot that is divided among multiple client identifiers. The cumulative data request check may consider the total percentage of server resources being given away, or a pattern in the requests. Also provided is a data protection system containing a log file, a request analyzer, and a dynamically-generated deny list. Requests to the server are intercepted and sent to the data protection system first.

24 Claims, 5 Drawing Sheets

SYSTEM AND METHOD FOR DYNAMICALLY LIMITING ROBOT ACCESS TO SERVER DATA

FIELD OF THE INVENTION

This invention relates generally to methods for limiting access of client computers over a computer network to data accessed through a server machine. More particularly, it relates to methods for monitoring client requests and denying access to clients whose requests significantly reduce server performance, or who are attempting to obtain excessively large portions of server resources.

BACKGROUND ART

The popularization of the Internet is changing the ways in which information is typically distributed. Rather than using a limited number of print publications, such as books or magazines, or gaining access to libraries, a person can obtain a great deal of information by accessing a Web server using a browser on a client computer.

Specialized Web sites exist that share large databases with the general public. For example, the U.S. Patent and Trademark Office (www.uspto.gov) provides a searchable full-text patent database containing all U.S. patents issued since 1976. Similarly, IBM hosts a Java™ Web site (www.ibm.com/java) through which developers access technical articles and case studies, and download code segments and other tools. Gourmet® and Bon Appetit® magazines jointly produce the Epicurious® (www.epicurious.com) Web site, which contains an enormous recipe database. Each of these sites allows users at client browsers to enter particular search queries, for example, patent classifications, code segment titles, or recipe ingredients. In response, the Web server provides the user with a set of matching Web pages. Each individual web page result can also be accessed directly using its Universal Resource Locator (URL).

Most Web servers track the number of times their sites are accessed, termed "hits"; popular Web sites receive thousands of hits in a single day. When a request is made to a server (a GET message), the request is logged in a log file. Log files are not standardized, but generally contain a timestamp, an identifier for,the client, and a request string. Web sites can then use the number of hits to attract advertisers to their site, offsetting their maintenance costs and allowing them to continue to provide unlimited and free access.

In addition to individual users, Web servers are also accessed heavily by robots, programs. that automatically traverse the Web to create an index. Robots, also known as spiders or webcrawlers, retrieve a document and then retrieve all the linked documents contained with the initial retrieved document, rapidly spreading throughout the Web. They may also systematically march through every document on a server. Robots are most commonly, but not exclusively, used by search engines. One robot (ImageLock) records every single image it encounters to determine possible Copyright infringers. Robots are not inherently destructive, but they can cause two significant problems for a Web server, both of which are referred to as "overcrawling." First, if they request documents too frequently, they may significantly reduce a server's performance. Second, it is possible (although often a violation of copyright law) to systematically download an entire Web site information repository using a robot, and then publish the information elsewhere.

Currently, these problems are addressed manually. If a system administrator notices a significant performance decrease, he or she can examine the log files to determine the source of the problem. If one robot is causing the problem, it can be excluded using the Robot Exclusion Standard: the system administrator creates a structured text file called/ robots.txt that indicates parts of the server that are off-limits to specific robots. In general, robots read the file before making a request, and do not request files from which they are excluded. However, even if a robot does not follow the standard, it is possible to exclude it if its Internet Protocol (IP) address is known.

Manual patrolling of log files is quite time-consuming for the system administrator, especially as a Web site's hit count grows. Because it cannot be done in real-time, a crawler is blocked only after it has slowed down site performance dramatically, or after it has downloaded significant amounts of server resources.

A standard method for automatically limiting access to data is through the use of a firewall. A firewall is set of related programs that protect the resources of a private network by regulating access of outsiders to the network (and often also by regulating access of insiders to the Internet). Firewalls may allow outside access only to users with specific IP addresses or passwords, or may provide alarms when network security is being breached. However, they are generally not designed for protecting the resources of servers that provide information to the general public.

A variety of systems have been developed to monitor access of clients to server data. Two broad categories are found: those for clients who have previously registered to access a server, and who provide an identification that must be authorized; and systems for analyzing client activity to develop statistical data and client profiles, which can be used for marketing or advertising purposes. Both types of monitoring systems may also include features to determine if there is excessive traffic that will crash the server. Examples of the first category include U.S. Pat. No. No. 5,553,239, issued to Heath et al., which discloses a system and apparatus for monitoring a client's activity level during connection to a server; and U.S. Pat. No. 5,708,780 to Levergood et al., which provides a system for monitoring the requests an authorized client makes to a server. These systems cannot be used to address the current problem, which occurs in publicly accessible servers.

In the second category is U.S. Pat. No. 5,796,952, issued to Davis et al. In this system, a client profile is developed based on client requests and time spent using each requested file. A server stores information on the amount of data downloaded and the choices the client has made. Based on the data analysis, specific advertising can be sent to the client. This system does not address the problems detailed above, and is mainly concerned with the user's behavior after the requested file is sent to the client machine.

Real-time log file analysis is commonly performed; commercial software packages are available and can be tailored to suit a Web server's specific needs. These software packages maintain and analyze log files to create reports of demographics, purchasing habits, average time per visitor, and other information. In U.S. Pat. No. 5,787,253 to McCreery et al, an internet activity analyzer is disclosed. The analyzer provides source and destination information and indications of internet usage. It also detects potential server problems so that users may be notified. A real-time log file analyzer is also provided by U.S. Pat. No. 5,892,917, issued to Myerson. This analyzer creates supplemental log records for cached files that were likely used to satisfy user requests, in order to create a more accurate profile of user activity. None of the prior art log file analyzers use the gathered information to dynamically determine whether crawlers are abusing their access, either by excessively frequent requests or by downloading excessive portions of the server database, and none can dynamically decide to refuse access.

An additional problem, not addressed by the prior art, is that there is not always a one-to-one correlation between robots and IP addresses, or other client identifiers. For example, in many corporations, users access the internet through a gateway server. All of the users then have the same IP address, and may appear in a log file as a single user. Conversely, a robot might deceptively use multiple. IP addresses to systematically download Web site information without being detected.

There is a need, therefore, for a method for dynamically limiting robot access to server data as requests are being made.

OBJECTS AND ADVANTAGES

Accordingly, it is a primary object of the present invention to provide a system and method for dynamically blocking access of abusive robots to server resources.

It is an additional object of the invention to provide a method that dynamically blocks a client from accessing a server if it has made too many requests.

It is another object of the present invention to provide a method that dynamically blocks a client from accessing a server if it is attempting to download a significant portion of the server's database.

It is a further object of the present invention to determine whether excessive requests from a single client identifier are from a gateway server and represent legitimate requests from multiple users.

It is an additional object to track overcrawling from different client identifiers that represent one robot.

SUMMARY

These objects and advantages are attained by a method for limiting access of a client computer to data objects accessible through a server computer in a distributed computer network. Preferably, the distributed computer network is the Internet, and the data object is a Web page. The method is implemented in the server and automatically recognizes when a client computer is making requests too frequently or is accessing too much of the server computer's resources. The quantitative definitions of "too frequently" and "too much" are selected by a system administrator or equivalent to accommodate the needs and limitations of the particular server. The method can detect three types of clients: a single client making too frequent requests and accessing too much of the server resources; a group of clients in a subnet mask, in which the group requests too frequently for a single client, but does not access too much of the server data; and a single entity operating from multiple client computers but accessing too much of the server resources.

The method has four steps: receiving a request for a data object from a client computer, recording a log entry for the request in a log file, calculating client request values associated with the client identifier from the log entry and from previous log entries, and refusing to send the requested data object if at least one of the client request values exceeds one of a set of corresponding predefined maximum request values. Preferably, the server sends a refusal message to the client computer over the distributed computer network when the request is refused.

The log entry comprises a client identifier, preferably an IP address, and a timestamp for the request. In one embodiment, the calculated client request values include a request frequency for that client, calculated from the current log entry and from previous log entries associated with the same client identifier. The set of corresponding predefined maximum request values include a maximum request frequency, and the client's request frequency is compared with the maximum request frequency to determine whether the, client should be refused access. The maximum request frequency is defined as a number of requests $x_1$ in a time period $t_1$. Preferably, the predefined maximum request values also include at least one additional. maximum request frequency: $x_2$ requests in a time period $t_2$, where $x_1$ is not equal to $x_2$ and $t_1$ is not equal to $t_2$. Multiple, independently selectable maximum request frequencies help detect irregular patterns the robot may use to escape detection.

In a second embodiment, the log entry also includes at least one data object identifier, which may be a Universal Resource Locator (URL) for the data object. Alternately, the method includes an additional step of processing the request to generate a result set containing at least one result data object. In this case, the data object identifier corresponds to the result data object, and the request must be processed before the log entry can be completed. In this embodiment, the client request values include a cumulative data request, a measure of how much of the server resources the client has already requested and received in the past. The set of corresponding predefined maximum request values includes a data access threshold, the maximum amount or fraction of data the client may receive. If the client's cumulative data request exceeds the data access threshold, the client request is refused. Either embodiment (frequency or data threshold) may be used separately, or both may be used together, and the client may by refused access if any one of the client request values exceeds the corresponding predefined maximum request values, or only if all of them do.

Alternately, the cumulative data request value may be for all previous requests, including those with different client identifiers, not just clients having a single client identifier. However, only the current request is refused.

The invention also provides a method having additional steps of comparing the client identifier with a deny list including denied client identifiers and refusing to send the requested data object when the client identifier is on the deny list. If one or all of the client request values exceeds the corresponding predefined maximum request value, the client identifier is added to a dynamically-generated deny list. In an alternate embodiment, if the client identifier is on an exception list, the client identifier cannot be added to the deny list, even if the request values are too high.

Finally, the invention provides a data protection system associated with the server. The system includes a log file described above, a request analyzer, and a dynamically-generated deny list. The request analyzer calculates the request values and compares them with the corresponding predefined maximum request values to generate failed client identifiers. The failed client identifiers are added to the deny list. When the server receives a new request from a known client, it refuses the request if the known client has a client identifier matching one of the failed client identifiers. In a preferred embodiment, the system also contains means for removing a specific failed client identifier from the deny list.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
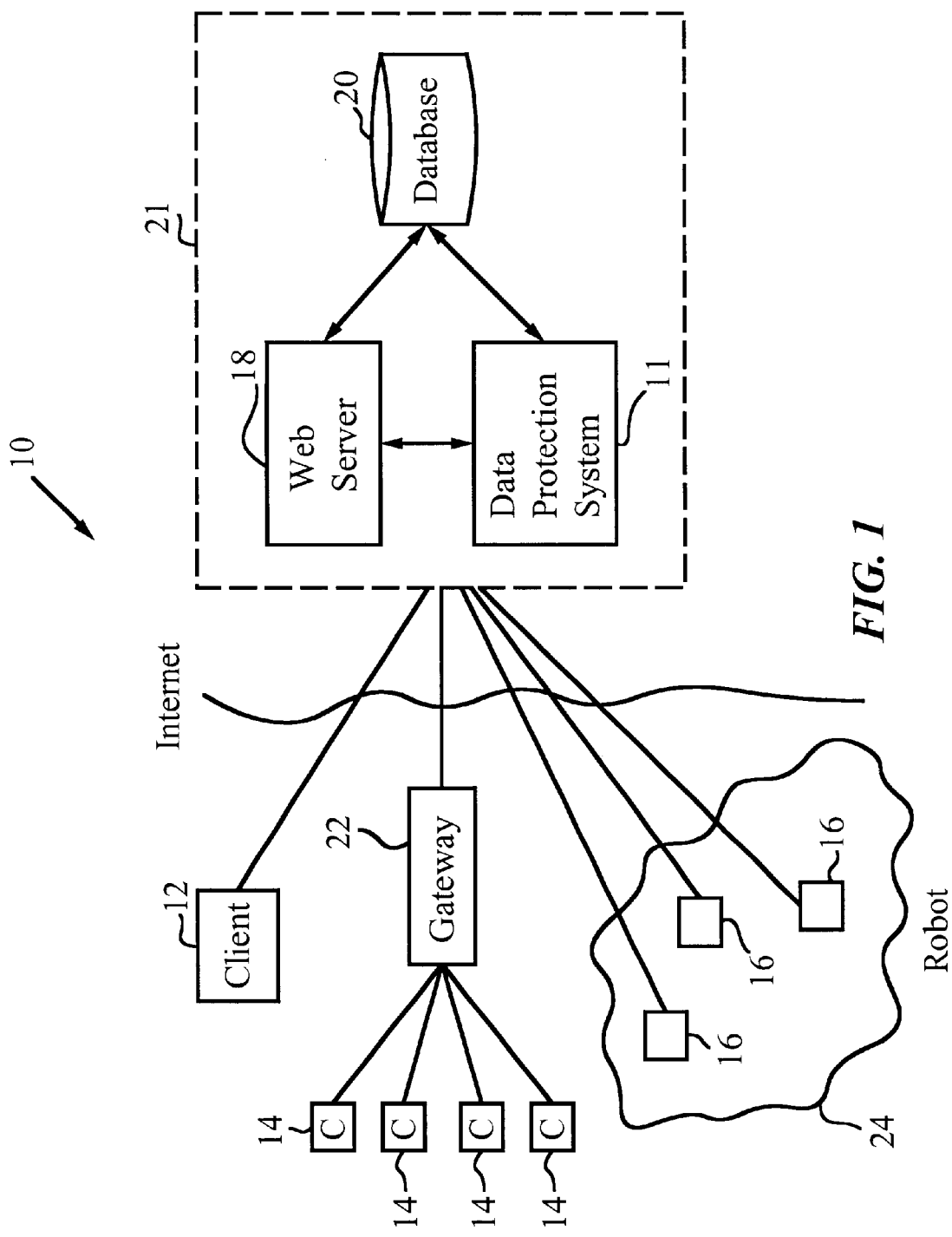
FIG. 1 is a block diagram of a distributed computer network incorporating the data protection system of the present invention.

FIG. 1 illustrates a distributed computer network 10 incorporating a data protection system 11 of the present invention. Preferably, network 10 is the Internet, but it may also be a corporate intranet or other network. Client computers 12, 14, and 16 request and receive data objects, stored in a database 20, from a Web server 18, which may be any type of server, running a conventional operating system such as UNIX or Windows NT. When the present invention is included, the requests are intercepted by data protection system 11 before being granted. System 21, including Web server 18, data protection system 11, and database 20, may be implemented as a single computer or as several different computers. As illustrated with client 12, clients may access Web server 18 directly (through an Internet service provider). Corporate clients 14 usually obtain access through a gateway server 22 on a local area network (LAN), which may limit their access to approved. Web sites. While robots, also known as spiders or webcrawlers, usually run on a server, a robot 24 may also operate through a set of client machines 16, which do not appear to server 18 to be connected with one another. Web server 18 can identify the source of requests by determining the Internet Protocol (IP) address from which the request originates. For a robot operating on a machine 16, server 18 can directly determine its IP address. For clients 14, however, server 18 can determine only the IP address of gateway 22. Subnets within the LAN have distinct addresses, but these are not available to server 18. In most cases, requests from clients 14 appear to be from a single source.

As used here, the term "data object" refers to any discrete piece of data stored on the server or on a different computer but accessed through the server. The data object may be a file or a database. For example, search engines have an index database that they use to generate results matching user search queries. Preferably, a data object is a Web-page or HTML document, which may have other files, such as image or audio files, embedded within or linked to the document. The data object itself can also be an image, audio, or video file.

Most of the users receiving data objects from server 20 are legitimate; they are infrequently obtaining a small amount of data for their own use, and do not intend to republish it. Data protection system 11 distinguishes them from abusive robots, who either reduce server performance or "steal" information to use for another purpose. In general, clients contain Web browser programs through which users interact with Web server 18 according to hypertext transfer protocol (HTTP). In the browser, users enter Universal Resource Locators (URLs) for desired Web pages, search queries, and other information. Users can also request pages by clicking on hyperlinks within a hypertext markup language. (HTML) document. These requests are sent to the Web server in the form of HTTP GET messages, and the server responds by sending the user the requested data object. For example, the U.S. Patent and Trademark Office (PTO) operates a Web server at www.uspto.gov that provides access to a searchable database of U.S. patents. Users accessing the database through a client computer request specific Web pages or enter search queries to find patents matching a set of keywords, classifications, or other data. Client 12 may be used by an independent inventor who searches the PTO database at home. Employees of a company may search the PTO database at clients 14 while at work. However, a robot 16 might be used to systematically download the entire database.

The present invention provides a method and data protection system for limiting access of client computers to data objects accessed through the server computer. Specifically, the invention prevents overcrawling by robots, also known as spiders or webcrawlers, by denying access to robots that make too frequent requests, which significantly reduce server performance, or that attempt to download systematically an unacceptably large portion of the server database. The method and system work by analyzing log files and dynamically deciding whether to reject current and future requests from a specific robot. A key feature of the invention is that it blocks robots without blocking legitimate users. It can then ensure that the majority of hits a Web site receives are from legitimate users, and not from automatic robots. A Web site can use this guarantee to help attract advertisers. The method can be implemented as a server plug-in that intercepts requests and only passes them on for server processing if they satisfy all of the necessary criteria.

Figure 2:
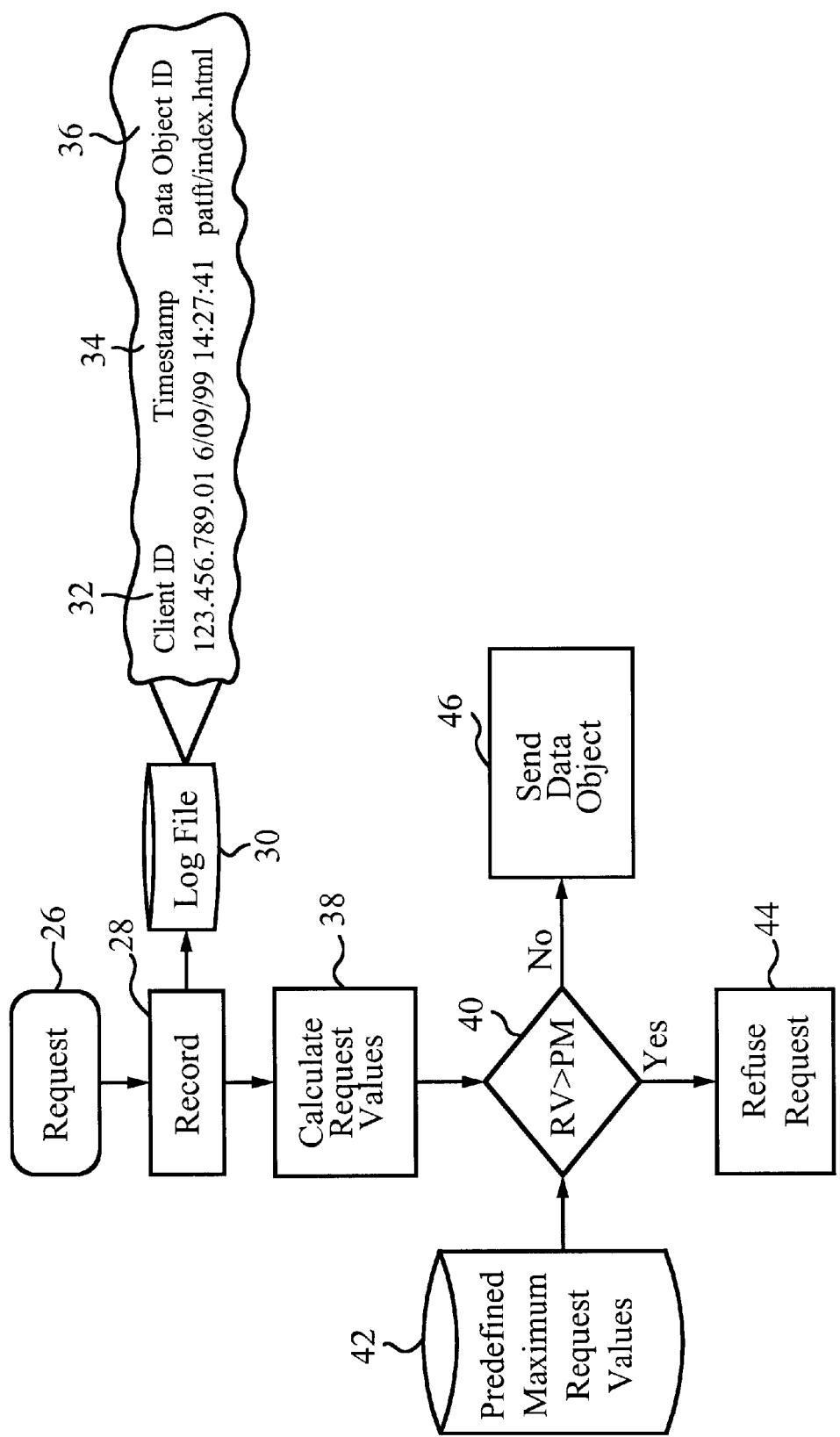
FIG. 2 is a block diagram of a method of the present invention.

A block diagram of the method is shown in FIG. 2. The method is carried out within data protection system 11 of FIG. 1 in cooperation with Web server 18 and database 20 and is preferably performed for every request sent to the server. A server receives a request 26 for a data object from a client machine over a distributed computer network. In step 28, a log entry for request 26 is recorded in a log file 30. Entries in log file 30 preferably contain a client identifier 32 and a timestamp 34, and most preferably also a data object identifier 36. Client identifier 32 is preferably an IP address, but may also be a URL. Request values are calculated in step 38 from the log entry for request 26 and previous log entries. The request values may be only for log entries having a client identifier matching that of request 26, in which case the request values are client request values, or they may be for all log entries. In step 40, a comparison is made between the calculated request values and a set of corresponding predefined maximum request values 42. If one of the request values exceeds a corresponding predefined maximum request value, the request is refused in step 44. Otherwise, the requested data object is sent (step 46). Predefined maximum request values are set by the system administrator or equivalent and can be changed as needed.

Preferably, a refused client identifier is added to a deny list. Incoming requests are compared with the deny list immediately after being logged in the log file, and automatically denied if the client identifier is on the deny list. Most preferably, before the client identifier is added to the deny list, it is compared with an exception list, which contains client identifiers that have been granted unlimited access and may not be refused.

There are two main embodiments of the client request values and corresponding predefined maximum request values 42. In the first main embodiment, the system monitors request frequency for a specific client identifier. For a new request, the server locates previous log entries having the same client identifier, and calculates a request frequency for that client. The request frequency is compared with a maximum request frequency. Preferably, there are many additional maximum request frequencies to which the client request frequency is compared, to detect irregular request patterns the client may use in an attempt to avoid detection. For example, a robot may have periods of inactivity punctuated by short bursts of high request frequency. The short bursts may tie up server bandwidth and should be prevented, but on a long time scale, the request frequency appears reasonable. Alternately, the robot may make low frequency requests but, over time, obtain a large portion of the server resources, in which case it will be caught by the long time period check. Each maximum request frequency is defined as a number of requests $x_i$ in a time period $t_i$.

Figure 3:
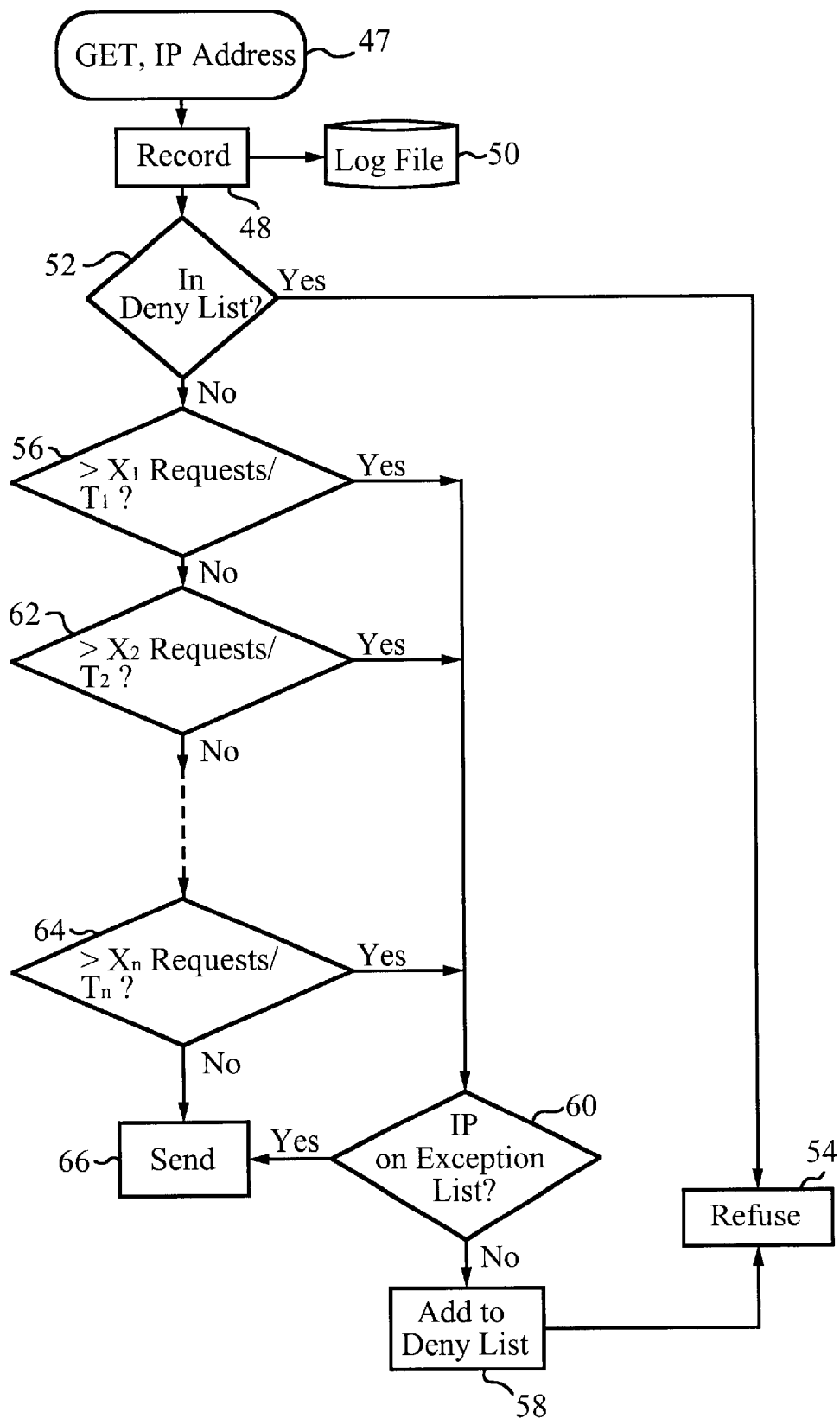
FIG. 3 is a block diagram of a preferred embodiment of the frequency check method of the present invention.

FIG. 3 illustrates a preferred embodiment of the method for checking client request frequencies. First, in step 47, the GET message and IP address or other client identifier are obtained. In step 48, the relevant information is recorded in a log file 50. The client identifier is compared with a deny list (step 52) to determine whether it has been previously refused. If it is on the deny list, the client is automatically refused (step 54), and no further calculations are carried out.

After the initial steps are completed, and if the client identifier is not on the deny list, the frequency checks are performed. FIG. 3 shows at least three frequency checks, but any number may be used, including only one if desired. In step 56, the number of requests the client identifier has made within a predefined time period $t_1$ is determined from the log file. Time period $t_1$ may be any time period, from milliseconds to days, weeks, or even years. This number of requests is compared with a predefined maximum number, $x_1$. Values for $t_1$ and $x_1$ are chosen by the system administrator or equivalent and depend upon the server, database, or Web site requirements. If the client identifier has more than $x_1$ requests, the client identifier is added to the deny list in step 58. Before being added, it may be compared with an exception list in step 60, and only added to the deny list if it is not in the exception list. After being added to the deny list, the client is refused access to the requested data object in step 54.

If the client request values pass first frequency check 56, further frequency checks are performed in steps 62 and 64: client requests are determined for time periods $t_2$ through $t_n$ and compared with $x_2$ through $x_n$. The $t_i$'s are preferably all independently selectable, and the $x_i$'s are preferably all independently selectable. Preferably, the $t_i$'s and $x_i$'s are selected so that they provide a sequence of successive independent criteria. If the client fails any of the checks, the client identifier is added to the deny list (step 58) and the request is refused (step 54). If the client identifier passes last frequency check 64, the requested data object is sent in step 66. Of course, an overall pass or fail may consist of any other suitable combination of passes and fails for the individual frequency checks.

Alternately, the method illustrated in FIG. 3 can be carried out without using the deny list or the exception list. Steps 52, 58, and 60 are removed, and "yes" responses to checks 56, 62, and 64 lead directly to refusal, step 54.

In most cases, the frequency check is not sufficient for detecting abusive robots. In fact, the frequency check only detects robots that are quite blatant in their abuse. It also might reject multiple users connected through a subnet mask (clients 14 of FIG. 1), and who appear to be from a single IP address. A more accurate check involves examining the type and amount of. data being sent to a single IP address. Multiple users with a single IP address might exceed the maximum frequency, but will make random, uncorrelated requests and, as a group, will repeatedly request the same data objects. Robots, on the other hand, make systematic requests and do not repeat requests. The two can be distinguished by examining the data objects requested by a single client identifier. Two possible criteria for distinguishing robots are the percentage of the database they obtain and the systematic nature of their requests. For the system to be able to distinguish between the two, the log file must contain a data object identifier, so that the cumulative data requested by the client can be determined.

The cumulative data check is also useful for detecting crawlers that use multiple client identifiers, as shown in robot 24 of FIG. 1. A crawler might divide a systematic procedure among many client machines, each of which alone does not appear to be obtaining too much of the database. However, a study of all of the requests, not just those from a single client identifier, reveal that a large portion of the database is being sent out, or that a systematic procedure involving slight changes in requested URLs is being used. For example, if a client requests data objects 1, 2, and 3, and then the same or a different client requests data objects 4, 5, and 6, the requests might be from an abusive robot. In this case, each new IP address is rejected as it is discovered to be a part of the robot system.

Figure 4:
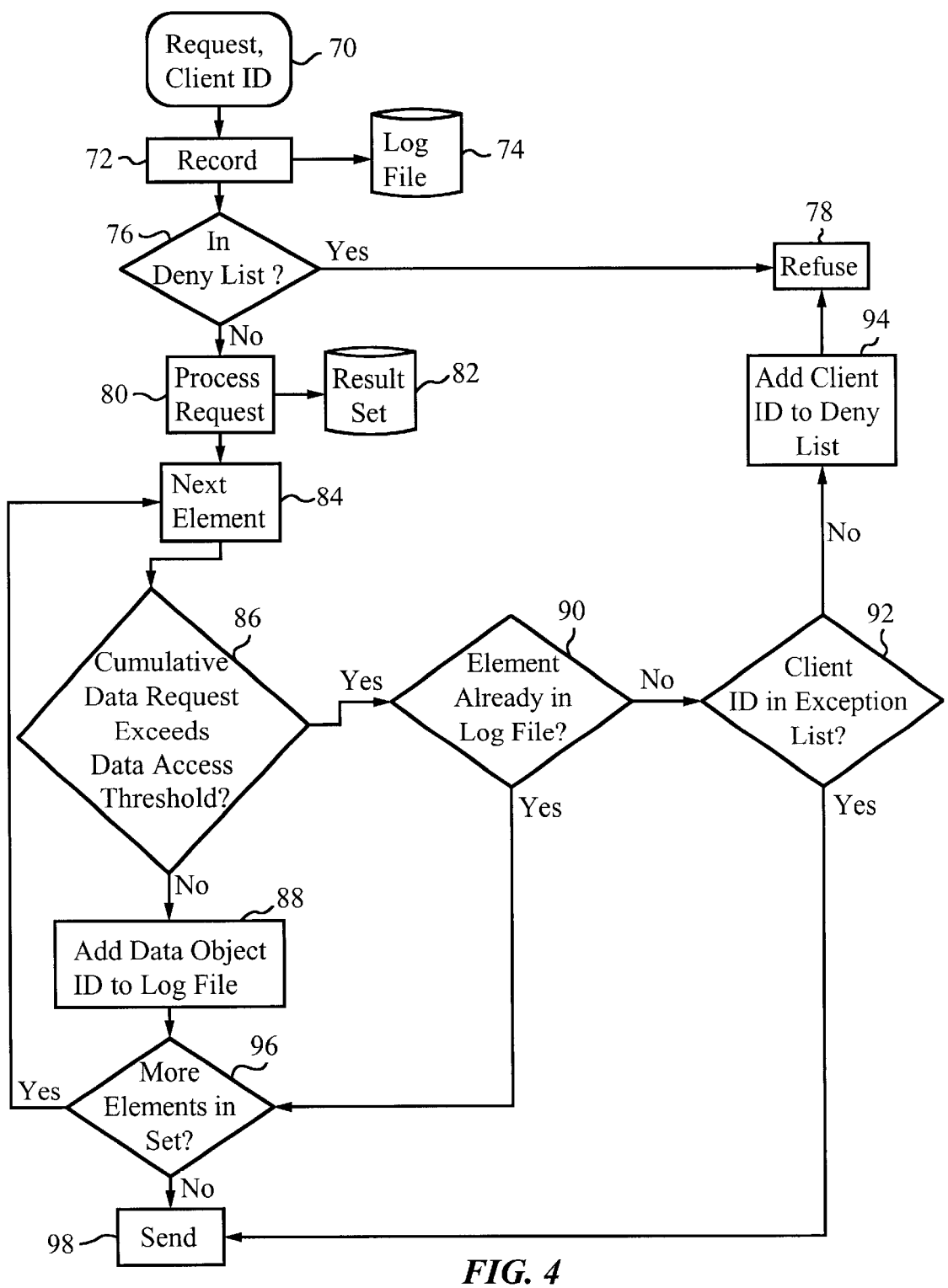
FIG. 4 is a block diagram of a preferred embodiment of the cumulative data check method of the present invention.

FIG. 4 illustrates a preferred embodiment of the check for amount of data being sent out. For the method of FIG. 4, the request values that are calculated include a cumulative data request, and the corresponding predetermined maximum values include a data access threshold.

In the first step of FIG. 4, a request and client identifier 70 are obtained. Two types of request are possible. One is a simple GET message for a specific URL within the Web server. Alternately, the request may be a search query; in the example above for the PTO database, the query may be a keyword for a patent keyword search. An entry containing a client identifier and timestamp for the request is recorded in a log file 74 in step 72. Next, in step 76, the client identifier is compared with a deny list. If the client identifier is in the deny list, the request is refused, step 78. If the client identifier is not in the deny list, the request is processed in step 80; i.e., a search is performed for the query to generate a result set 82 containing result data objects. If the request does not require a search to be performed, then step 80 is unnecessary. In this case, result set 82 contains one or more requested URLs.

Step 84 begins a series of steps that are carried out for each data object in the result set. In step 86, a cumulative data request is determined for the client identifier or, alternately, for all requests logged. The cumulative data request identifies all of the previous data objects that this client has obtained. Alternately, the cumulative data request identifies all of the data objects that have been obtained by all clients through this server. After calculating the cumulative data request, the system determines whether the extra data object requested will increase the cumulative data request over the predefined data access threshold. If not, a data object identifier for the element is added to the log entry for the current request for this client identifier in step 88, and the system proceeds to the next element. Preferably, the data object identifier is a URL.

If the cumulative data request does exceed the threshold when the current data object is included, the system then checks, in step 90, whether or not the current data object is already included in the log file, either for the client identifier or at all, depending on which type of check is being performed. If the data object is already in the log file, then the current reque'st is probably not from an abusive robot; sending it to the client is not giving away too much data. However, if the current element has not been given away previously, then the client will be refused. In step 92, the exception list is checked before the client identifier is added to the deny list in step 94 and refused in step 78.

If the data object passes the tests of steps 86 and 90, the system checks for more data objects in the result set in step 96, and then moves to the next element in step 84. If all of the elements pass, then the results are sent in step 98. Preferably, if one of the elements fails, the client identifier is assumed to deserve blocking, and none of the result data objects will be sent. Of course, other criteria may be chosen.

Additional steps may be added between steps 96 and 98. The system may need to process the request further, or it may need to supply other information along with the result data objects. For example, the system might create a results page containing a list of and hyperlinks to the search results, which it only does after determining that the request should be granted. In addition, only some of the server resources may be protected, while other resources are freely granted.

As shown in FIG. 4, steps 86 and 90 are used to determine the fraction of the database that has been requested and received by a client. Alternate embodiments of these steps may also be used. For example, a-robot may be systematically marching through every file in the server database, by slightly altering a filename with every request, for example. The current request can be compared with previous requests to determine if there is a pattern.

As with the frequency checks, the method for checking cumulative data request can be performed without steps 76, 92, and 94, i.e., without the deny list and exception list. A "no" response to step 90 leads directly to refusal, step 78.

The two main embodiments, the frequency check and cumulative data check, may be used together or separately. If they are used together, the request values include both a request frequency and a cumulative data request, and the corresponding predefined maximum values include both a maximum request frequency and a data access threshold. The client identifier fails and is rejected if one of the request values exceeds the corresponding predefined maximum request values. Alternately, the client identifier fails if all of the request values exceed the predefined maxima. Of course, any other number, between one and all, may be chosen.

Preferably, for the combined embodiment, the frequency check is performed first, followed. by the cumulative data request check. Instead of sending the requested data object if the client identifier passes the frequency checks, as is done in step 66 of FIG. 3, the system passes the request to the cumulative data check, beginning with step 80 of FIG. 4. Alternately, the second test may used depending on the outcome of the first test—only if it is failed or only if it is passed. For example, there might be a frequency above which a cumulative data check is not needed; the frequency is so high and slows down the server so dramatically that blocking. the crawler is justified.

Figure 5:
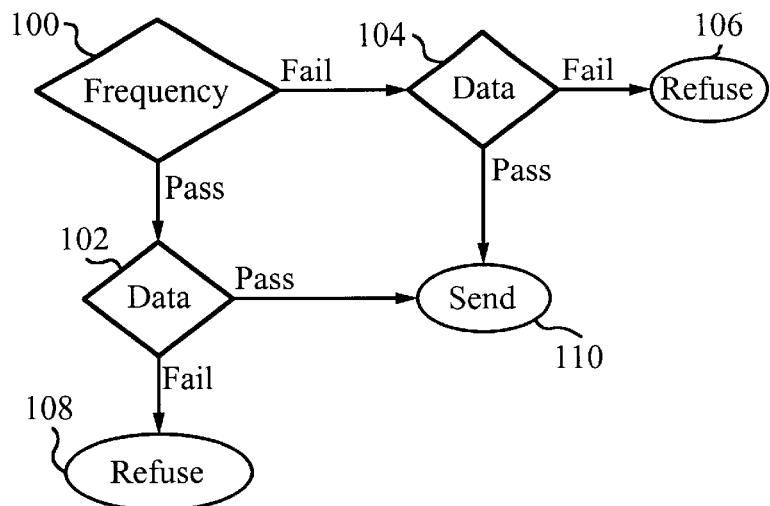
FIG. 5 is a schematic diagram of a preferred combination of the frequency check and data check methods of the present invention.

FIG. 5 shows the flow of the preferred embodiment of a combined test, for the different types of clients. First, a frequency check 100 is performed, followed by a data threshold check 102 or 104. Depending on the combined outcomes, the request is either refused (106 or 108) or sent (110). User examples are as follows:

1. Overcrawling robot: single client with single IP address. Fails frequency check 100 and fails data check 104: refused (106).
2. Legitimate users: multiple clients with single IP address. Fails frequency check 100 but passes data check 104: data sent (110).
3. Overcrawling robot: single client with multiple IP addresses. Passes frequency check 100 but fails data check 102: refused (108).
4. Legitimate users: single client with single IP address (also multiple clients with multiple IP addresses). Passes frequency check 100 and passes data check 102: data sent (110).

Figure 6:
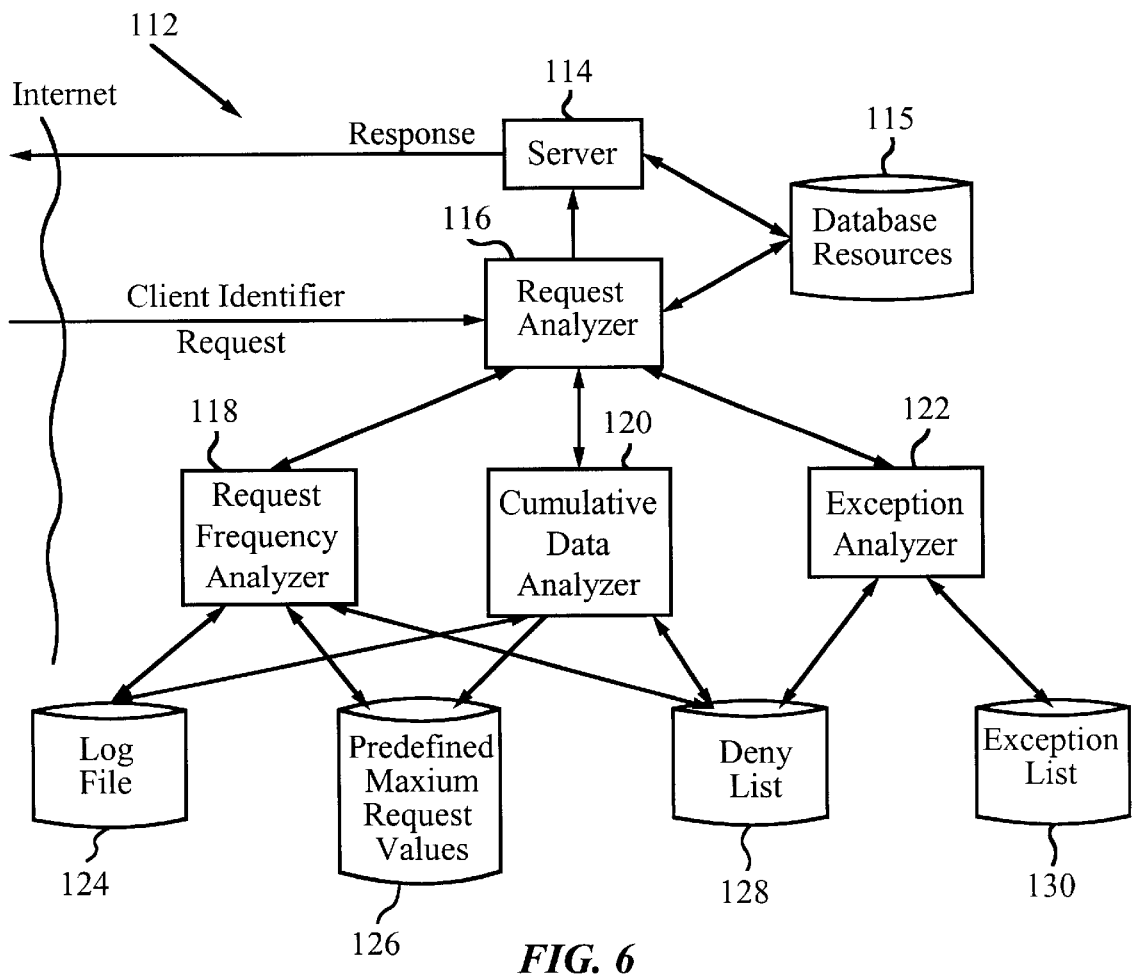
FIG. 6 is a block diagram of a data protection system of the present invention.

A preferred embodiment of a data protection system 112 used to implement the method is displayed schematically in FIG. 6. A client identifier and request directed to a Web server 114 are intercepted and sent to a request analyzer 116. The request analyzer may be an additional computer, or it may be implemented as a Web server plug-in. The request is for a data object stored within database resources 115, which may be in server 114 or on a different computer. Request analyzer 116 may have individual analyzer pieces, shown in FIG. 6 as a request frequency analyzer 118, a cumulative data analyzer 120, and an exception analyzer 122. Request analyzer 116 interacts with a log file 124, a set of predefined maximum request values 126, a dynamically-generated deny list 128, and means for removing a specific failed client identifier from deny list 128, in this case an exception list 130.

The data protection system of FIG. 6 operates as follows. When a request from a known client is received by request analyzer 116, a log entry is made in log file 124 for the request. As discussed above, the log entry contains a client identifier and time stamp for the request, and preferably also a data object identifier for the requested data object. Next, request analyzer 116 checks whether the client identifier for the new request is in deny list 128. If it is, it sends a "fail" message to server 114, and server 114 refuses to send the requested data object.

If the client identifier is not in deny list 128, request frequency analyzer 118 calculates the client request frequency from all of the relevant entries in log file 124. It then compares this request value with a corresponding element of set 126, the maximum request frequency. If the client request frequency exceeds the maximum request frequency, the client identifier is considered a failed client identifier, and is added to deny list 128.

Next, cumulative data analyzer 120 adds a data object identifier to the current log entry in file 124. Depending on the type of request, cumulative data analyzer 120 may need to search database resources 115 to determine which data objects the client has requested. After a search result set is obtained, a data object identifier for a result data object is added to the current log entry in log file 124. Alternately, the request may be for a URL, and cumulative data analyzer 120 simply adds the URL to the log entry.

Based on the requested data objects, cumulative data analyzer 120 calculates the cumulative data request, either from previous log entries for the current client identifier, or from all previous log entries. It then compares the cumulative data request with a data access threshold in set 126. If the cumulative data request exceeds the data access threshold, the client identifier is a failed client identifier, and is added to deny list 128. Depending on the decision of the system administrator, a client identifier that fails the frequency check but passes the cumulative data check may be removed from deny list 128. As explained above, the cumulative data check may be for a particular client identifier, or it may be for all data given to all clients, in order to detect a robot using multiple client identifiers. Request analyzer 116 may include either or-both of request frequency analyzer 118 and cumulative data analyzer 120.

If the request passes both the request check and the cumulative data check, request analyzer 116 sends a message to server 114 to process the request and send the results to the client. If the request has failed one or both of the checks, depending on the configuration set up by the network administrator, the failed client identifier is sent to exception analyzer 122. If the failed client identifier is also on exception list 130, exception analyzer 122 removes the newly-added failed client identifier from deny list 128. Alternately exception analyzer 122 compares the failed client identifier with exception list 130 before it is added to deny list 128. If the client identifier is on the exception list, request analyzer 116 sends a message to server 114 that the request may be granted.

If the request fails, and if the client identifier is not on the exception list, then request analyzer 116 sends a message to server 114 that the request must be refused. Server 114 may send a message to the client that the request was refused, with no further information. Preferably, the message informs the client why the request was refused, stating that the client has made too many requests, that the client has obtained too much of the server database, or that the client's request indicates that it is a part of a multi-client system of obtaining too much of the database.

Most preferably, the message also states that if the user has a legitimate purpose for the apparent overcrawling, he or she may request to register with the Web site and be added to the exception list. Continuing the example of the PTO Web site, an intellectual property firm might have employees constantly sending requests and downloading patents from the database. At some point, it is likely that this firm will exceed either one of the maximum request frequencies or the data access threshold. However, the firm is not publishing the patents elsewhere. Upon receiving the rejection message, the firm can prove their legitimacy and register with the Web site. They will then be added to the exclusion list and will be able to make unlimited requests. The registration may expire at specific time intervals, for example, 6 months or one year, at which point the user must reregister.

Of course, as robots learn of the present invention, they will devise methods for circumventing the frequency checks and data checks. Just as computer virus detection software is updated periodically as new viruses are developed, the present invention may also be updated periodically to keep up with new techniques robots develop.

It will be clear to one skilled in the art that the above embodiment may be altered in many ways without departing from the scope of the invention. For example, the type of cumulative data used check may depend on the results of the frequency checks. Accordingly, the scope of the invention should be determined by the following claims and their legal equivalents.

What is claimed is:

1. A method for protecting a web server from abusive clients, the method comprising:
   a) receiving at said webserver client requests from said abusive clients comprising originating IP addresses and requested data objects;
   b) recording log entries associated with the client requests in a request log file;
   c) denying at said webserver client requests from an IP address failing a frequency check, wherein the frequency check comprises determining from the log file if a request frequency from the IP address exceeds a predetermined maximum request frequency;
   d) denying at said webserver client requests from an IP address failing a cumulative data check, wherein the cumulative data check comprises determining from the log file if a cumulative data request value for the IP address exceeds a predetermined data access threshold; and
   e) denying at said webserver client requests from multiple IP addresses failing a second cumulative data check, wherein the second cumulative data check comprises identifying systematic request patterns,
      wherein said abusive clients are webcrawlers sending said client requests over the Internet to said webserver.

2. In a server computer in a distributed computer network, a method for protecting data objects accessible on said server computer from excessive access by an abusive client computer, said method comprising the steps of:
   a) receiving at said server computer a request from said client computer for one of said data objects accessible on said server computer;
   b) recording a log entry associated with said request in a log file, wherein said log entry comprises a client identifier, at least one data object identifier, and a timestamp for said request, wherein said client identifier is an IP address;
   c) calculating client request values associated with said client identifier from said log entry and from previous log entries associated with said client identifier, wherein said client request values comprise a request frequency and a cumulative data request value;
   d) refusing to send from the server computer said requested data object to said client computer if at least one of said client request values exceeds one of a set of corresponding predefined maximum request values, wherein said predefined maximum request values comprise a maximum request frequency and a data access threshold; and
   e) calculating a second cumulative data request value from said log entry and from previous log entries associated with all client identifiers, and refusing to send from the server computer said requested data object to said client computer if the second cumulative data request value exceeds a second data access threshold,
      wherein said distributed computer network is the Internet and said client computer is a webcrawler.

3. The method of claim 1 further comprising sending a refusal message to said client computer over said distributed computer network if said requested data object is refused.

4. The method of claim 1 wherein said maximum request frequency comprises a number of requests $x_1$ in a time period $t_1$.

5. The method of claim 4 wherein said predefined maximum request values further comprise at least one additional maximum request frequency, wherein said additional maximum request frequency comprises a number of requests $x_2$ in a time period $t_2$.

6. The method of claim 2 wherein said requested data object is a Web page and said data object identifier comprises a Universal Resource Locator for said Web page.

7. The method of claim 2 further comprising processing said request to generate a result set comprising at least one result data object, wherein said data object identifier corresponds to said result data object.

8. The method of claim 2 wherein said request is refused if all of said client request values exceed said predefined maximum request values.

9. The method of claim 2 further comprising a step of adding said client identifier to a deny list if one of said client request values exceeds one of said predefined maximum request values.

10. In a server computer in a distributed computer network, a method for protecting data objects accessible on said server computer from excessive access by an abusive client computer, said method comprising the steps of:
 a) receiving at the server computer a request for one of said data objects from said client computer;
 b) recording a log entry associated with said request in a log file, wherein said log entry comprises a client identifier and a timestamp for said request;
 c) comparing said client identifier with a deny list comprising denied client identifiers;
 d) refusing to send from said server computer said requested data object to said client computer if said client identifier is on said deny list;
 e) if said client identifier is not on said deny list, calculating client request values associated with said client identifier from said log entry and from previous log entries associated with said client identifier, wherein said client request values comprise a request frequency and a cumulative data request value; and
 f) adding said client identifier to said deny list if at least one of said client request values exceeds one of a set of corresponding predefined maximum request values, wherein said predefined maximum request values comprise a maximum request frequency and a data access threshold,
  wherein said distributed computer network is the Internet and said client computer is a webcrawler.

11. The method of claim 10 wherein said maximum request frequency comprises a number of requests $x_1$ in a time period $t_1$.

12. The method of claim 11 wherein said predefined maximum request values further comprise at least one additional maximum request frequency, wherein said additional maximum request frequency comprises a number of requests $x_2$ in a time period $t_2$.

13. The method of claim 10 wherein said requested data object is a Web page and said data object identifier comprises a Universal Resource Locator for said Web page.

14. The method of claim 10 further comprising processing said request to generate a result set comprising at least one result data object, wherein said data object identifier corresponds to said result data object.

15. The method of claim 10 further comprising adding said client identifier to said deny list if all of said client request values exceed said predefined maximum request values.

16. The method of claim 10 wherein said client identifier is an IP address.

17. The method of claim 10 further comprising adding said client identifier to said deny list if one of said client request values exceeds one of said redefined maximum request values and said client identifier is not on an exception list comprising allowed client identifiers.

18. In a distributed computer network comprising a server computer and client computers, wherein said client computers request data objects from said server computer, a data protection system associated with said server computer, said data protection system comprising:
 a) a log file comprising log entries, wherein each of said log entries corresponds to a client request from one of said client computers for one of said data objects from said server computer and comprises a client identifier, a data object identifier, and a timestamp;
 b) a request analyzer associated with said server computer for calculating client request values from said log entries, wherein said client request values comprise a client request frequency and a cumulative data request value, and for comparing said client request values with a set of corresponding predefined maximum request values comprising a maximum request frequency and a data access threshold, to generate failed client identifiers; and
 c) a dynamically-generated deny list comprising said failed client identifiers, wherein said request analyzer compares a new request from a known client computer with said deny list and refuses said new request if said known client computer has a client identifier matching one of said failed client identifiers,
  wherein said computer network is the Internet and said client computer is a webcrawler.

19. The data protection system of claim 18, further comprising means for removing a specific failed client identifier from said deny list.

20. The data protection system of claim 18 wherein said maximum request frequency comprises a number of requests $x_1$ in a time period $t_1$.

21. The data protection system of claim 20 wherein said predetermined criteria further comprise at least one additional maximum request frequency, wherein said additional maximum request frequency comprises a number of requests $x_2$ in a time period $t_2$.

22. The data protection system of claim 18 wherein said requested data object is a Web page and said data object identifier comprises a Universal Resource Locator for said Web page.

23. The data protection system of claim 18 wherein said client request is processed to generate a result set comprising at least one result data object, and wherein said data object identifier corresponds to said result data object.

24. The data protection system of claim 18 wherein said client identifier is an IP address.

* * * * *